United States Patent
Wu et al.

(10) Patent No.: US 7,595,512 B2
(45) Date of Patent: Sep. 29, 2009

(54) COLOR FILTER AND FABRICATING METHOD THEREOF

(75) Inventors: Pei-Hsun Wu, Hsinchu (TW); Ying-Che Lan, Hsinchu (TW); Chih-Haw Wang, Hsinchu (TW); Chia-Yang Hsu, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 81 days.

(21) Appl. No.: 11/564,848

(22) Filed: Nov. 30, 2006

(65) Prior Publication Data

US 2008/0030657 A1 Feb. 7, 2008

(30) Foreign Application Priority Data

Aug. 4, 2006 (TW) .............................. 95128594 A

(51) Int. Cl.
*H01L 29/20* (2006.01)

(52) U.S. Cl. .......................................... 257/89; 257/88

(58) Field of Classification Search ............. 257/88–89, 257/98

See application file for complete search history.

(56) References Cited

U.S. PATENT DOCUMENTS 5,606,462 A * 2/1997 Tsuruoka et al. ............ 359/891

| | | | |
|---|---|---|---|
| 7,139,049 B2 * | 11/2006 | Yoshida | 349/106 |
| 7,208,764 B2 * | 4/2007 | Furusawa | 257/72 |
| 2002/0009277 A1 | 1/2002 | Noda et al. | |
| 2003/0218704 A1 | 11/2003 | Lee et al. | |
| 2004/0135944 A1 | 7/2004 | Kim | |
| 2004/0227874 A1 | 11/2004 | Kim et al. | |

* cited by examiner

*Primary Examiner*—Wai-Sing Louie
*Assistant Examiner*—Bilkis Jahan
(74) *Attorney, Agent, or Firm*—Jianq Chyun IP Office

(57) ABSTRACT

A color filter including a substrate and a color filter layer is disclosed. The color filter layer is disposed on the substrate and includes a red photonic crystal structures, a green photonic crystal structure and a blue photonic crystal structure. The red photonic crystal structure includes a first defect resonance cavity and has multiple first holes surrounding the first defect resonance cavity. The green photonic crystal structure includes a second defect resonance cavity and has multiple second holes surrounding the second defect resonance cavity. The blue photonic crystal structure includes a third defect resonance cavity and has multiple third holes surrounding the third defect resonance cavity. Wherein, the hole diameter of the first holes is less than the hole diameter of the second holes, and the hole diameter of the second holes is less than the hole diameter of the third holes.

39 Claims, 9 Drawing Sheets

COLOR FILTER AND FABRICATING METHOD THEREOF

CROSS-REFERENCE TO RELATED APPLICATION

This application claims the priority benefit of Taiwan application serial no. 95128594, filed Aug. 4, 2006. All disclosure of the Taiwan application is incorporated herein by reference.

BACKGROUND OF THE INVENTION

1. Field of the Invention

The present invention relates to a color filter, and more particularly, to a color filter using photonic crystal structures as the color filter layer thereof.

2. Description of Related Art

Because of its excellent display quality and economic advantage, cathode ray tubes (CRTs) have dominated the market in recent years. However, it may not be a perfect choice for a user who simultaneously operates several computer terminals/displays, or from the view of environmental protection. In view of the energy saving trend, the CRT has many problems, such as limited space utilization and considerable energy consumption. In particular, the CRT is not capable of providing a solution to meet the light, slim, short and small tendency today and the demand on low power consumption. Therefore, the thin film transistor liquid crystal display (TFT LCD) with the predominant features, such as high display quality, high space utilization, low power consumption and no radiation, gradually becomes the main stream of the market. market.

Currently, LCDs are in progress towards full colorization, large screen, high resolution and low cost, wherein the color display effect is achieved normally by utilizing a color filter. A color filter is usually disposed on a transparent glass substrate, where a black matrixes (BM) for light-shielding and color filter units respectively corresponding to each pixel in specific arrangement, for example, red filter units, green filter units and blue filter units, are disposed.

Recently, a sort of color filter adopting a photonic crystal structure as the color filter layer thereof has been developed. In 1987, Professors Eli Yablonovitch and Sajeev John together initially presented the photonic crystal principle. According to the principle, the light in some frequency bands is not able to exist in a photonic crystal structure by means of a periodic arrangement of different refractive indices. In other words, a photonic crystal itself does not possess a specific color, but allows a light with a specific wavelength to be transmitted based on a special design consideration, so as to emit red light, green light or blue light.

In US Patent Publication No. 20030218704 filed by Samsung Electronics Co., Ltd., a reflective display element is provided, wherein a photonic crystal structure serves as the color filter layer in an LCD panel and a light-filtering effect is achieved by using the optical forbidden area of a photonic crystal to reflect the light having a specific wavelength. For example, in order to get blue light, a photonic crystal structure is used to substitute the traditional blue photoresist and the hole dimensions and structure periodic intervals of the photonic crystal must be configured through design, so that the desired optical forbidden area is corresponding to the wavelength of blue light.

Since the structure periodic intervals and dimensions respectively corresponding to red light, green light and blue light are different from each other, three additional photolithography processes are required, which increases the fabrication complexity and reduces the production yield. Besides, an optical forbidden area possesses a specific frequency width, which would result in the problem of insufficient color saturation with the color filter layer by using a photonic crystal structure.

SUMMARY OF THE INVENTION

Accordingly, an objective of the present invention is to provide a color filter capable of solving the problem of insufficient color saturation caused by using a photonic crystal structure as the color filter layer.

Another objective of the present invention is to provide a color filter with higher light utilization efficiency.

Another yet objective of the present invention is to provide a method for fabricating a color filter, wherein the method is capable of effectively simplifying the process complexity.

Another yet objective of the present invention is to provide a color filter, which possesses both black-white display mode and color display mode.

Another yet objective of the present invention is to provide a color filter with higher optical transmittance.

Another yet objective of the present invention is to provide a method for fabricating a color filter, by using the fabricated color filter, the display quality of a display device can be advanced.

The present invention provides a color filter, which includes a substrate and a color filter layer. The color filter layer is disposed on the substrate and includes red photonic crystal structure, green photonic crystal structure and blue photonic crystal structure. The red photonic crystal structure includes a first defect resonance cavity, multiple first holes surrounding the first defect resonance cavity and multiple fourth holes in a periodic arrangement. The green photonic crystal structure includes a second defect resonance cavity, multiple second holes surrounding the second defect resonance cavity and the fourth holes in a periodic arrangement. The blue photonic crystal structure includes a third defect resonance cavity, multiple third holes surrounding the third defect resonance cavity and the fourth holes in a periodic arrangement. Wherein, the diameter of the first holes is less than the diameter of the second holes, and the diameter of the second holes is less than the diameter of the third holes.

According to the embodiment of the present invention, in the above-described color filter, the material of the color filter layer includes dielectric material.

According to the embodiment of the present invention, the above-described color filter further includes a black matrixes (BM) disposed on the substrate to define multiple pixel regions on the substrate.

According to the embodiment of the present invention, in the above-described color filter, the red photonic crystal structure, the green photonic crystal structure and the blue photonic crystal structure are respectively disposed in the corresponding pixel regions.

According to the embodiment of the present invention, in the above-described color filter, the substrate includes a transparent substrate.

The present invention also provides a color filter, which includes a substrate and a color filter layer. The color filter layer is disposed on the substrate and includes red photonic crystal structure, green photonic crystal structure and blue photonic crystal structure. The red photonic crystal structure includes multiple first defect resonance cavities, multiple first holes surrounding the first defect resonance cavities and multiple fourth holes in a periodic arrangement, wherein the distance between two adjacent first defect resonance cavities is larger than or equal to three periodic intervals. The green photonic crystal structure includes multiple second defect resonance cavities, multiple second holes surrounding the second defect resonance cavities and the fourth holes in a periodic arrangement, wherein the distance between two adjacent second defect resonance cavities is larger than or equal to three periodic intervals. The blue photonic crystal structure includes multiple third defect resonance cavities, multiple third holes surrounding the third defect resonance cavities and the fourth holes in a periodic arrangement, wherein the distance between two adjacent third defect resonance cavities is larger than or equal to three periodic intervals. Wherein, the diameter of the first holes is less than the diameter of the second holes, and the diameter of the second holes is less than the diameter of the third holes.

The present invention provides a method for fabricating a color filter. First, a substrate is provided. Next, a photonic crystal material layer is formed on the substrate. Afterwards, the photonic crystal material layer is patterned for forming a color filter layer. Wherein, the color filter layer includes red photonic crystal structure, green photonic crystal structure and blue photonic crystal structure. The red photonic crystal structure includes a first defect resonance cavity, multiple first holes surrounding the first defect resonance cavity and multiple fourth holes in a periodic arrangement. The green photonic crystal structure includes a second defect resonance cavity, multiple second holes surrounding the second defect resonance cavity and the fourth holes in a periodic arrangement. The blue photonic crystal structure includes a third defect resonance cavity, multiple third holes surrounding the third defect resonance cavity and the fourth holes in a periodic arrangement. Wherein, the diameter of the first holes is less than the diameter of the second holes, and the diameter of the second holes is less than the diameter of the third holes.

According to the embodiment of the present invention, in the above-described method for fabricating a color filter, the material of the color filter layer includes dielectric material.

According to the embodiment of the present invention, the above-described method for fabricating a color filter further includes forming a BM to define multiple pixel regions on the substrate.

According to the embodiment of the present invention, in the above-described method for fabricating a color filter, the formed red photonic crystal structure, green photonic crystal structure and blue photonic crystal structure are respectively disposed in the corresponding pixel regions.

According to the embodiment of the present invention, in the above-described method for fabricating a color filter, the substrate includes a transparent substrate.

The present invention further provides a color filter, which includes a substrate, an organic material layer and a color filter layer. The substrate includes reflective regions and transmissive regions. The organic material layer is disposed on the substrate and in the reflective region. The color filter layer is disposed on the substrate and covers the organic material layer. The color filter layer includes red photonic crystal structures, green photonic crystal structures and blue photonic crystal structures. The red photonic crystal structure includes a first defect resonance cavity disposed in the transmissive region, multiple first holes surrounding the first defect resonance cavity and multiple fourth holes in a periodic arrangement. The green photonic crystal structure includes a second defect resonance cavity disposed in the transmissive region, multiple second holes surrounding the second defect resonance cavity and the fourth holes in a periodic arrangement. The blue photonic crystal structure includes a third defect resonance cavity disposed in the transmissive region, multiple third holes surrounding the third defect resonance cavity and the fourth holes in a periodic arrangement. Wherein, the diameter of the first holes is less than the diameter of the second holes, and the diameter of the second holes is less than the diameter of the third holes.

According to the embodiment of the present invention, the above-described color filter further includes a BM disposed on the substrate to define multiple pixel regions on the substrate.

According to the embodiment of the present invention, in the above-described color filter, a reflective region and a transmissive region are adjacently disposed in each of pixel regions.

According to the embodiment of the present invention, in the above-described color filter, a reflective region and two transmissive regions are alternately disposed in each of pixel regions.

According to the embodiment of the present invention, in the above-described color filter, the material of the organic material layer is silicon nitride or silicon oxide.

The present invention further provides a color filter, which includes a substrate, an organic material layer and a color filter layer. The substrate includes reflective regions and transmissive regions. The organic material layer is disposed on the substrate and in the reflective region. The color filter layer is disposed on the substrate and covers the organic material layer. The color filter layer includes red photonic crystal structures, green photonic crystal structures and blue photonic crystal structures. The red photonic crystal structure includes multiple first defect resonance cavities disposed in the transmissive region, multiple first holes surrounding the first defect resonance cavities and multiple fourth holes in a periodic arrangement, wherein the distance between two adjacent first defect resonance cavities is larger than or equal to three periodic intervals. The green photonic crystal structure includes multiple second defect resonance cavities disposed in the transmissive region, multiple second holes surrounding the second defect resonance cavities and the fourth holes in a periodic arrangement, wherein the distance between two adjacent second defect resonance cavities is larger than or equal to three periodic intervals. The blue photonic crystal structure includes multiple third defect resonance cavities disposed in the transmissive region, multiple third holes surrounding the third defect resonance cavities and the fourth holes in a periodic arrangement, wherein the distance between two adjacent third defect resonance cavities is larger than or equal to three periodic intervals. Wherein, the diameter of the first holes is less than the diameter of the second holes, and the diameter of the second holes is less than the diameter of the third holes.

The present invention further provides a method for fabricating a color filter. First, a substrate is provided, which includes reflective regions and transmissive regions. Next, an organic material layer is formed on the substrate and in the reflective region. Afterwards, a photonic crystal material layer is formed on the substrate and covers the organic material layer. Further, the photonic crystal material layer is patterned to form a color filter layer. Wherein, the color filter layer includes red photonic crystal structure, green photonic crystal structure and blue photonic crystal structure. The red photonic crystal structure includes a first defect resonance cavity disposed in the transmissive region, multiple first holes surrounding the first defect resonance cavity and multiple fourth holes in a periodic arrangement. The green photonic crystal structure includes a second defect resonance cavity disposed in the transmissive region, multiple second holes surrounding the second defect resonance cavity and the fourth holes in a periodic arrangement. The blue photonic crystal structure includes a third defect resonance cavity disposed in the transmissive region, multiple third holes surrounding the third defect resonance cavity and the fourth holes in a periodic arrangement. Wherein, the diameter of the first holes is less than the diameter of the second holes, and the diameter of the second holes is less than the diameter of the third holes.

According to the embodiment of the present invention, the above-described method for fabricating a color filter further includes forming a BM disposed on the substrate to define multiple pixel regions on the substrate.

According to the embodiment of the present invention, in the above-described method for fabricating a color filter, a reflective region and a transmissive region are adjacently disposed in each of the pixel regions.

According to the embodiment of the present invention, in the above-described method for fabricating a color filter, a reflective region and two transmissive regions are alternately disposed in each of the pixel regions.

According to the embodiment of the present invention, in the above-described method for fabricating a color filter, the material of the organic material layer is silicon nitride or silicon oxide.

Based on the above described, owing to the disposition of the defect resonance cavities, the color filter provided by the present invention is able to effectively control the frequency width thereof for advancing color saturation.

When multiple defect resonance cavities are disposed in each photonic crystal structure, the color filter provided by the present invention is able to increase the optical transmittance of the color filter layer, so as to advance the display brightness of an LCD.

Besides, since the color filter provided by the present invention utilizes the difference of refractive indices to generate a total reflection effect, therefore, the color filter is able to realize the light-collecting effect, increase the light utilization efficiency, reduce the usage of lens films (brightness-increasing films) for saving the cost and decrease the dark state oblique light-leaking for increasing the display contrast.

Moreover, since only one photolithography process is needed in the method for fabricating a color filter provided by the present invention, thus, the present invention is able to simplify the process complexity, lower the fabrication cost and advance the production yield.

On the other hand, when the color filter of the present invention is applied to a transflective display, since the color filter layer in the reflective region has no defect resonance cavity, the color filter is able to be operated in black and white display mode; while the color filter layer in the transmissive region has the defect resonance cavities, the color filter is able to be operated in color display mode. Therefore, the color filter provided by the present invention is able to be simultaneously operated in both black and white display mode and color display mode.

When the color filter provided by the present invention is used in a transflective display, the relative position between the reflective region and the transmissive region can be adjusted to obtain a better display quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
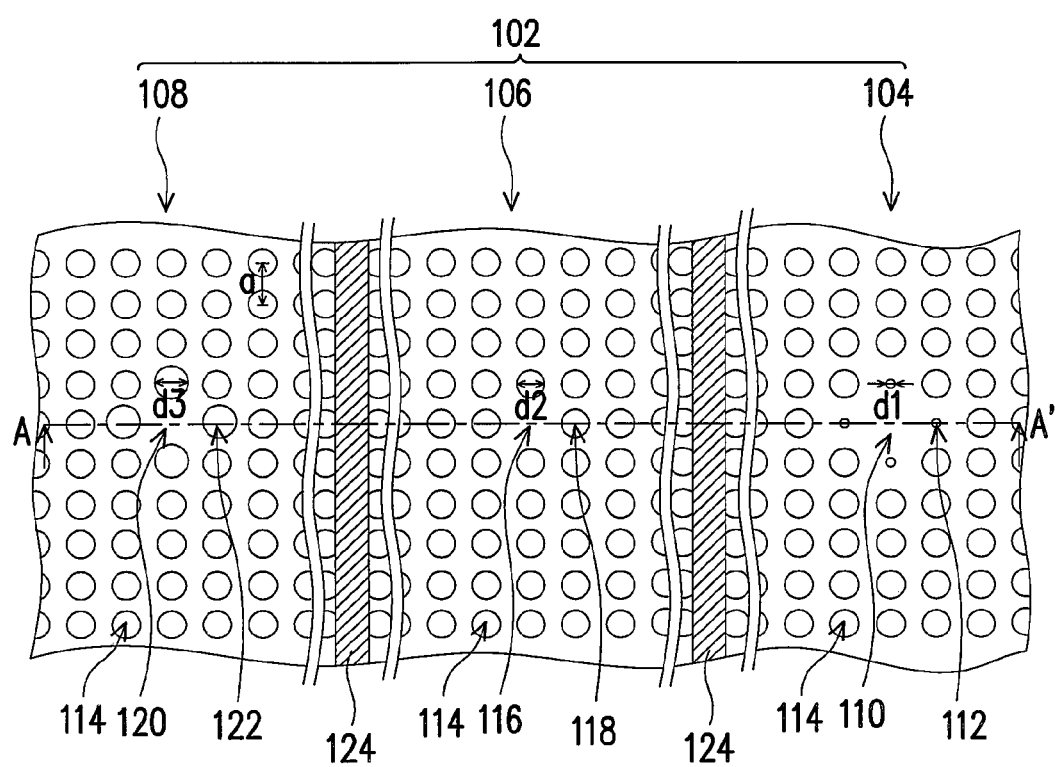
FIG. 1 is a top view of a color filter provided by the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
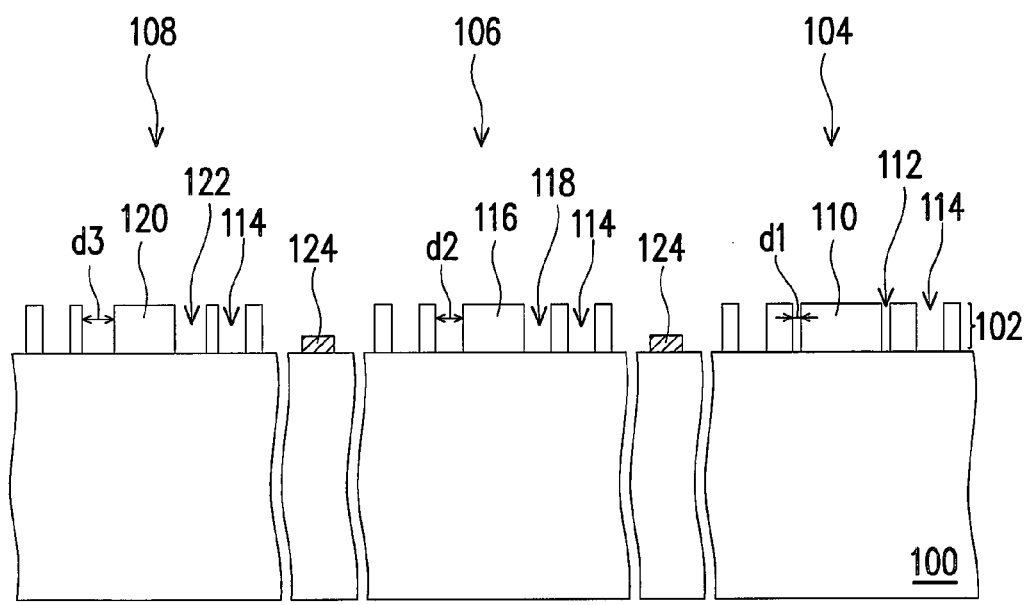
FIG. 2 is a cross-sectional drawing along plane A-A' in FIG. 1.

FIG. 1 is a top view of a color filter provided by the first embodiment of the present invention. FIG. 2 is a cross-sectional drawing along plane A-A' in FIG. 1.

Referring to FIGS. 1 and 2, a color filter includes a substrate 100 and a color filter layer 102. The substrate 100 is, for example, a transparent substrate, such as a glass substrate.

The color filter layer 102 is disposed on the substrate 100 and includes red photonic crystal structure 104, green photonic crystal structure 106 and blue photonic crystal structure 108. The material of the color filter layer 102 is dielectric material, for example, silicon nitride.

The red photonic crystal structure 104 includes a first defect resonance cavity 110, multiple first holes 112 surrounding the first defect resonance cavity 110 and multiple fourth holes 114 in a periodic arrangement and serves as a red filter unit.

The green photonic crystal structure 106 includes a second defect resonance cavity 116, multiple second holes 118 surrounding the second defect resonance cavity 116 and multiple fourth holes 114 in a periodic arrangement and serves as a green filter unit.

The blue photonic crystal structure 108 includes a third defect resonance cavity 120, multiple third holes 122 surrounding the third defect resonance cavity 120 and multiple fourth holes 114 in a periodic arrangement and serves as a blue filter unit.

In the present embodiment, the distance between two adjacent fourth holes 114 is defined as a periodic interval a, which is determined by resonance frequency f and light wavelength $\lambda$ through the expression of $f=a/\lambda$. The fourth holes 114 are periodically arranged, for example, in rectangular form; however, those skilled in the art should easily understand that different forms of periodic arrangement can be used in the present invention.

Since the first defect resonance cavity 110, the second defect resonance cavity 116 and the third defect resonance cavity 120 are respectively disposed in the red photonic crystal structure 104, the green photonic crystal structure 106 and the blue photonic crystal structure 108, the light with a specific frequency (red light, green light or blue light) is met at a forbidden area in the entire photonic crystal structure, which forces the light to radiate in an upward form.

In addition, a photonic crystal structure having a defect resonance cavity has a resonance model, which makes the light radiated out of the defect resonance cavity occupy a very narrow frequency width, so that a desired frequency can be extracted by adjusting the hole diameter of the holes surrounding the defect resonance cavity and is used to realize the high color saturation of an LCD. Among the red light, green light and blue light, the wavelength of red light is the longest, the green light takes the second and the wavelength of blue light is the shortest. In order to extract the frequencies required by red light, green light and blue light, in terms of the hole diameter design of the holes surrounding the defect resonance cavities, the holes in the red photonic crystal structure 104 are the smallest, the holes in the green photonic crystal structure 106 are in-between and the holes in the blue photonic crystal structure 108 are the largest. That is to say, the diameter d1 of the first hole 112 is less than the diameter d2 of the second hole 118, and the diameter d2 of the second hole 118 is less than the diameter d3 of the third hole 122.

Furthermore, a black matrix 124 is disposed on the substrate 100 to define multiple pixel regions (not shown) on the substrate 100, and the red photonic crystal structure 104, the green photonic crystal structure 106 and the blue photonic crystal structure 108 are respectively disposed in the corresponding pixel regions. The material of the black matrix 124 is, for example, chrome metal and the like or black photoresist material and the like.

Since the color filter has the first defect resonance cavity 110, the second defect resonance cavity 116 and the third defect resonance cavity 120, the color filter is able to effectively control the frequency width thereof and advance the color saturation. Besides, since the red photonic crystal structure 104 having the first defect resonance cavity 110, the green photonic crystal structure 106 having the second defect resonance cavity 116 and the blue photonic crystal structure 108 having the third defect resonance cavity 120 use the differences of refractive index to create the total reflection condition, therefore, the color filter possesses a light-collecting effect, so as to increase light utilization efficiency. In this way, the usage of lens films (brightness-increasing film) with an LCD can be reduced so as to lower the manufacturing cost. Furthermore, the dark state oblique light-leaking is reduced, and the display contrast is enhanced.

Figure 3A:
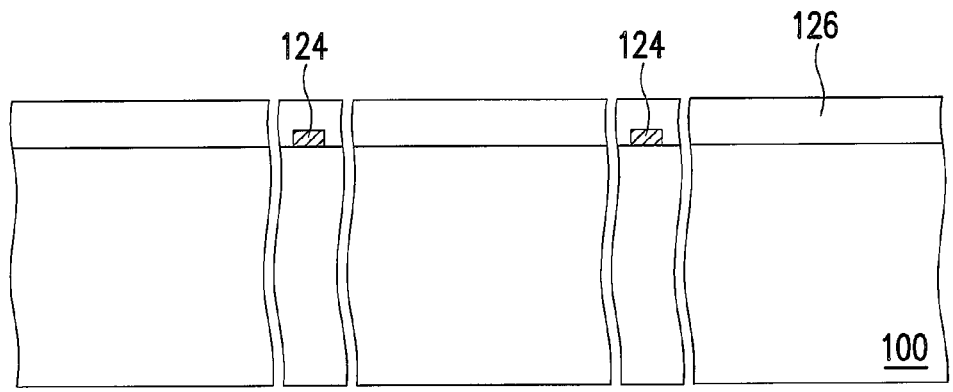
FIG. 3A and FIG. 3B are schematic cross-sectional drawings showing the process steps of the color filter in FIG. 2.
Figure 3B:
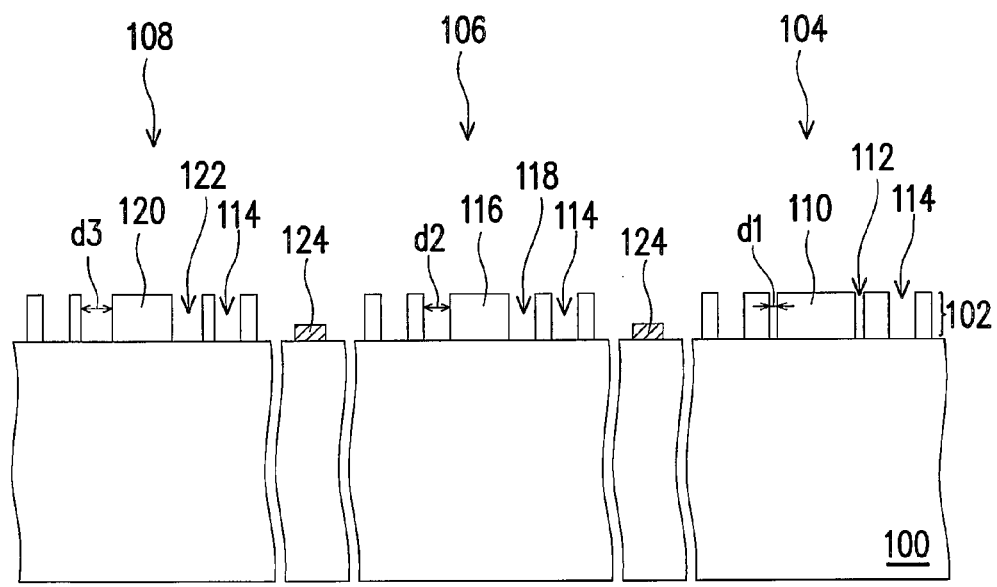

FIG. 3A and FIG. 3B are schematic cross-sectional drawings showing the process steps of the color filter in FIG. 2.

Referring to FIG. 3A, first, a substrate 100 is provided. The substrate 100 is, for example, a transparent glass such as a glass substrate. Next, a photonic crystal material layer 126 is formed on the substrate 100. The material of the photonic crystal material layer 126 is a transparent material, for example, silicon nitride and the like. The photonic crystal material layer 126 is formed by using, for example, chemical vapor deposition (CVD).

Besides, the black matrixes 124 are formed on the substrate 100 to define multiple pixel regions on the substrate 100, while the formed red photonic crystal structure 104, the green photonic crystal structure 106 and the blue photonic crystal structure 108 are respectively disposed in the corresponding pixel regions. The material of the black matrix 124 is, for example, chrome metal and the like or black photoresist material and the like. When the material of the black matrix 124 is chrome metal and the like, the forming method thereof is, for example, first, forming a metal material layer (not shown) on the substrate 100 by using physical vapor deposition (PVD) and then performing a patterning process on the metal material layer; when the material of the black matrix 124 is a black photoresist, the forming method thereof is, for example, first, forming a black photoresist material layer (not shown) on the substrate 100 by using coating and then performing an exposure and developing processes on the black photoresist material layer.

After that, referring to FIG. 3B, the photonic crystal material layer 126 is patterned, so as to form the color filter layer 102. The method for patterning a photonic crystal material layer 126 is, for example, performing a photolithography process on the photonic crystal material layer 126. The structure of the color filter layer 102 formed through the process steps shown by FIG. 3B is explained in detail in FIGS. 1 and 2, so it is omitted to describe herein for simplicity.

It should be noted that only one photolithography process is required in the fabricating method of a color filter provided by the present invention, thus, it is able to effectively reduce the process complexity and the fabrication cost, and further to advance the production yield.

Figure 4:
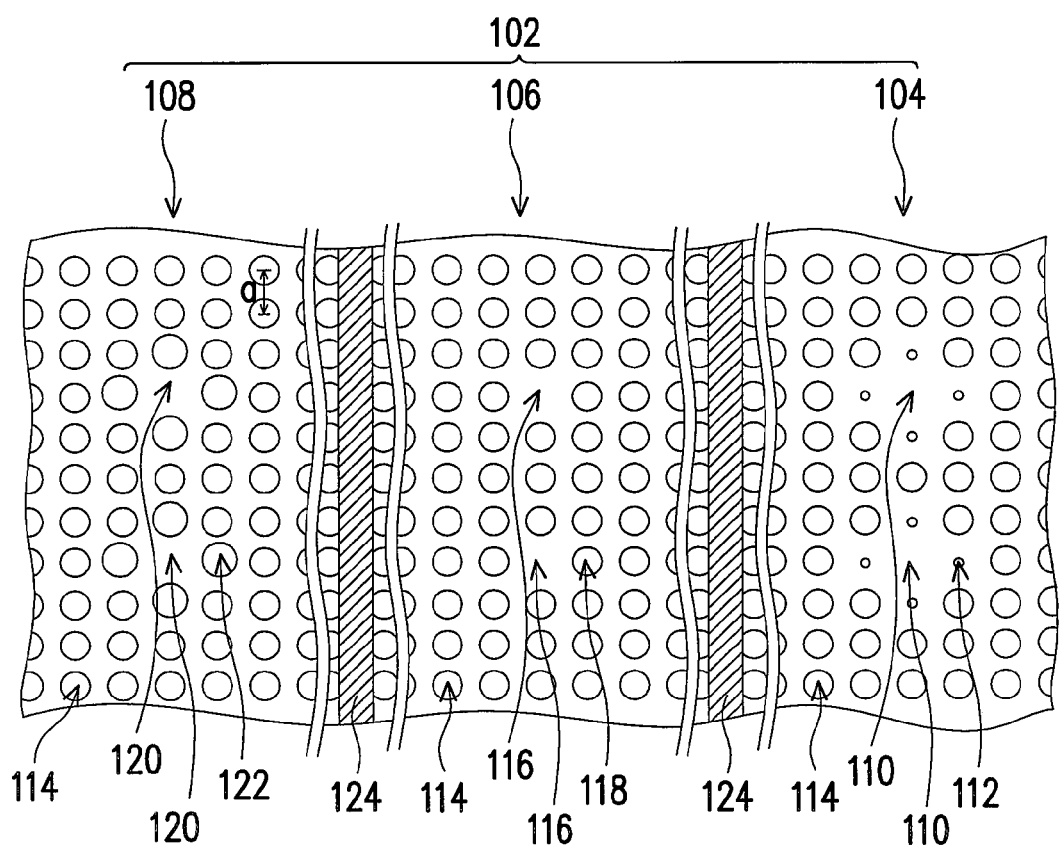
FIG. 4 is a top view of a color filter provided by the second embodiment of the present invention.

FIG. 4 is a top view of a color filter provided by the second embodiment of the present invention.

Referring to FIGS. 1 and 4, in the color filter of FIG. 1, the red photonic crystal structure 104, the green photonic crystal structure 106 and the blue photonic crystal structure 108 only have a first defect resonance cavity 110, a second defect resonance cavity 116 and a third defect resonance cavity 120, respectively, for providing the light with specific wavelength; therefore, the optical transmittance of the color filter layer 102 may not be sufficient, which affects the brightness of an LCD display.

However, in the color filter of FIG. 4, each red photonic crystal structure 104, green photonic crystal structure 106 and blue photonic crystal structure 108 respectively has multiple first defect resonance cavities 110, multiple second defect resonance cavities 116 and multiple third defect resonance cavities 120, where multiple defect resonance cavities are able to excite light with a same wavelength simultaneously, hence, the optical transmittance of the whole color filter layer can be increased. The other structure details in FIG. 4 are the same as the color filter of FIG. 1, and it is omitted to describe herein for simplicity.

It is remarkable that the distance between two adjacent defect resonance cavities in a same photonic crystal structure must be larger than or equal to three periodic intervals a, so as to avoid two adjacent defect resonance cavities from coupling to radiate light with undesired frequencies.

In the following, an embodiment of the present invention for a color filter applied in a transflective display is explained.

Figure 5:
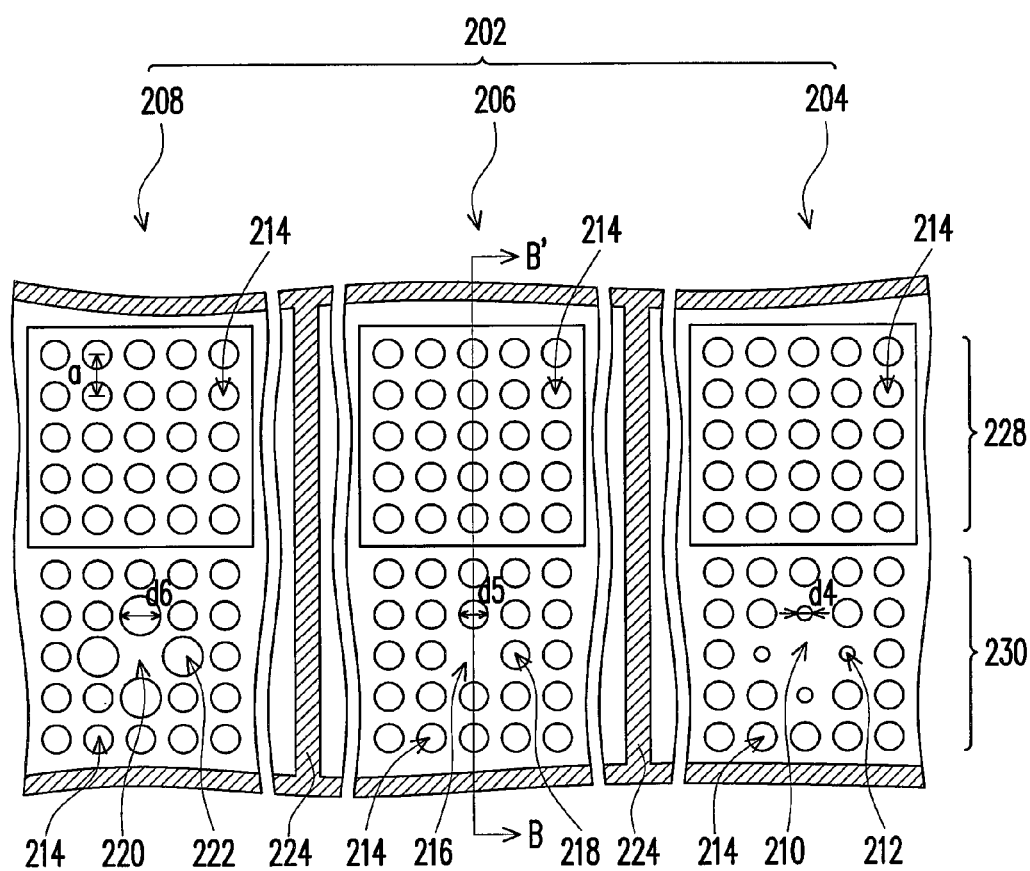
FIG. 5 is a top view of a color filter provided by the third embodiment of the present invention.
Figure 6:
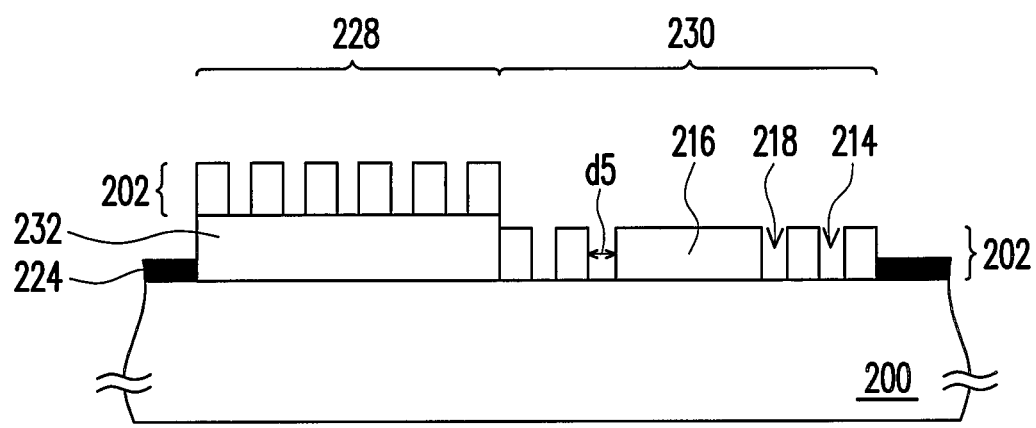
FIG. 6 is a cross-sectional drawing along plane B-B' in FIG. 5.

FIG. 5 is a top view of a color filter provided by the third embodiment of the present invention and FIG. 6 is a cross-sectional drawing along plane B-B' in FIG. 5.

First, referring to FIGS. 5 and 6, a color filter includes a substrate 200, an organic material layer 232 and a color filter layer 202. The substrate 200 includes a reflective region 228 and a transmissive region 230. The substrate 200 is, for example, a transparent substrate such as a glass substrate.

The organic material layer 232 is disposed on the substrate 200 and in the reflective regions 228, which serves to make the optical path length of the light passing the reflective region 228 and that of the light passing the transmissive region 230 the same. The material of the organic material layer 232 is, for example, silicon nitride or silicon oxide and the like.

The color filter layer 202 is disposed on the substrate 200 and covers the organic material layer 232. The color filter layer 202 includes red photonic crystal structure 204, green photonic crystal structure 206 and blue photonic crystal structure 208. The material of the color filter layer 202 is dielectric material, for example, silicon nitride.

The red photonic crystal structure 204 includes a first defect resonance cavity 210 disposed in the transmissive region 230, multiple first holes 212 surrounding the first defect resonance cavity 210 and multiple fourth holes 214 in a periodic arrangement and serves as a red filter unit.

The green photonic crystal structure 206 includes a second defect resonance cavity 216 disposed in the transmissive region 230, multiple second holes 218 surrounding the second defect resonance cavity 216 and multiple fourth holes 214 in a periodic arrangement and serves as a green filter unit.

The blue photonic crystal structure 208 includes a third defect resonance cavity 220 disposed in the transmissive region 230, multiple third holes 222 surrounding the third defect resonance cavity 220 and multiple fourth holes 214 in a periodic arrangement and serves as a blue filter unit.

In the present embodiment, the distance between two adjacent fourth holes 214 is defined as a periodic interval a, which is determined by resonance frequency f and light wavelength $\lambda$ through the expression of $f=a/\lambda$. The fourth holes 214 are arranged, for example but not limited by the present invention, in rectangular form.

In addition, in terms of the hole diameter design of the holes surrounding the defect resonance cavities, the holes in the red photonic crystal structure 204 are the smallest, the holes in the green photonic crystal structure 206 are in-between and the holes in the blue photonic crystal structure 208 are the largest. That is to say, the diameter $d1$ of the first hole 212 is less than the diameter $d2$ of the second hole 218, and the diameter $d2$ of the second hole 218 is less than the diameter $d3$ of the third hole 222.

Furthermore, a black matrix 224 is disposed on the substrate 200 to define multiple pixel regions (not shown) on the substrate 200, and the red photonic crystal structure 204, the green photonic crystal structure 206 and the blue photonic crystal structure 208 are respectively disposed in the corresponding pixel regions, and the reflective region 228 and the transmissive region 230 are adjacently disposed in each of the pixel regions. The material of the black matrix 224 is, for example, chrome metal and the like or black photoresist material and the like.

Since there are the first defect resonance cavity 210, the second defect resonance cavity 216 and the third defect resonance cavity 220 in the transmissive region 230 of the color filter, the color filter is able to perform color operations, while there is no defect resonance cavity in the reflective region 228, the color filter is able to perform black and white operations as well. Hence, the color filter has both black and white display display mode and color display mode.

Figure 7A:
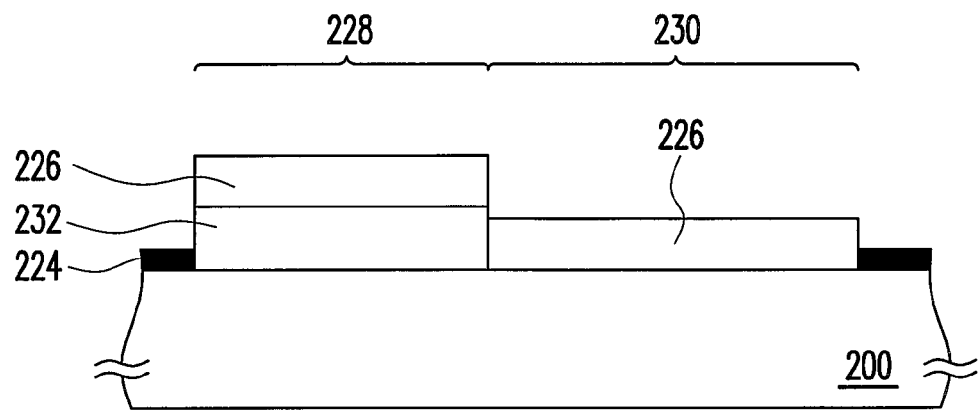
FIG. 7A and FIG. 7B are schematic cross-sectional drawings showing the process steps of the color filter in FIG. 6.
Figure 7B:
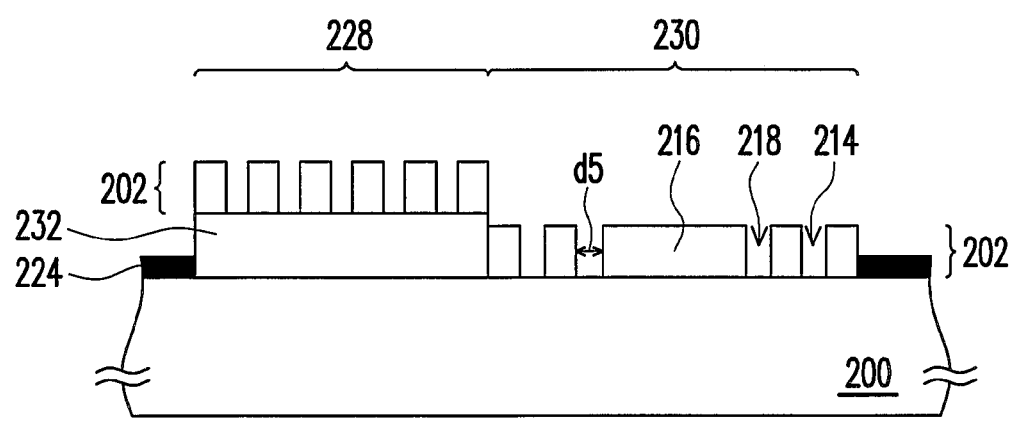

FIG. 7A and FIG. 7B are schematic cross-sectional drawings showing the process steps of the color filter in FIG. 6.

First, referring to FIG. 7A, a substrate 200 is provided. The substrate 200 includes a reflective region 228 and a transmissive region 230. The substrate 200 is, for example, a transparent glass such as a glass substrate.

Next, an organic material layer 232 is formed on the substrate 200 and in the reflective regions 228. The material of the organic material layer 232 is, for example, silicon nitride or silicon oxide and the like. The forming method of the organic material layer 232 in the reflective region 228 is, for example, forming an organic material layer 232 on the substrate 200 by using CVD first, followed by performing a patterning process on the organic material layer 232.

Next, a photonic crystal material layer 226 is formed on the substrate 200 and covers the organic material layer 232. The material of the photonic crystal material layer 226 is, for example, a transparent material such as silicon nitride. The photonic crystal material layer 226 is formed by using, for example, CVD.

In addition, a black matrix 224 can be formed on the substrate 200 for defining multiple pixel regions on the substrate 200, and the formed red photonic crystal structure 204, green photonic crystal structure 206 and blue photonic crystal structure 208 are respectively disposed in the corresponding pixel regions. The material of the black matrix 224 is, for example, chrome metal and the like or black photoresist material and the like. When the material of the black matrix 224 is chrome metal and the like, the forming method thereof is, for example, first, forming a metal material layer (not shown) on the substrate 200 by using physical vapor deposition (PVD) and then performing a patterning process on the metal material layer; when the material of the black matrix 224 is a black photoresist, the forming method thereof is, for example, first, forming a black photoresist material layer (not shown) on the substrate 200 by using coating and then performing an exposure and developing processes on the black photoresist material layer.

After that, referring to FIG. 7B, the photonic crystal material layer 226 is patterned, so as to form a color filter layer 202. The method for patterning the photonic crystal material layer 226 is, for example, performing a photolithography process on the photonic crystal material layer 226. The structure of the color filter layer 202 formed through the process steps shown by FIG. 7B is explained in detail in FIGS. 5 and 6, so it is omitted to describe herein for simplicity.

Although the above-described fabricating method of a color filter aims at the green photonic crystal structure 206 in FIG. 5, but it is considered as exemplary only. Anyone skilled in the art should be able to extend the above described to the fabricating method of the red photonic crystal structure 204 and the blue photonic crystal structure 208 in FIG. 5 without any difficulty.

It should be noted that only one photolithography process is required in the fabricating method of a color filter provided by the present invention, thus, it is able to effectively reduce the process complexity and the fabrication cost, and further to advance the production yield.

Figure 8:
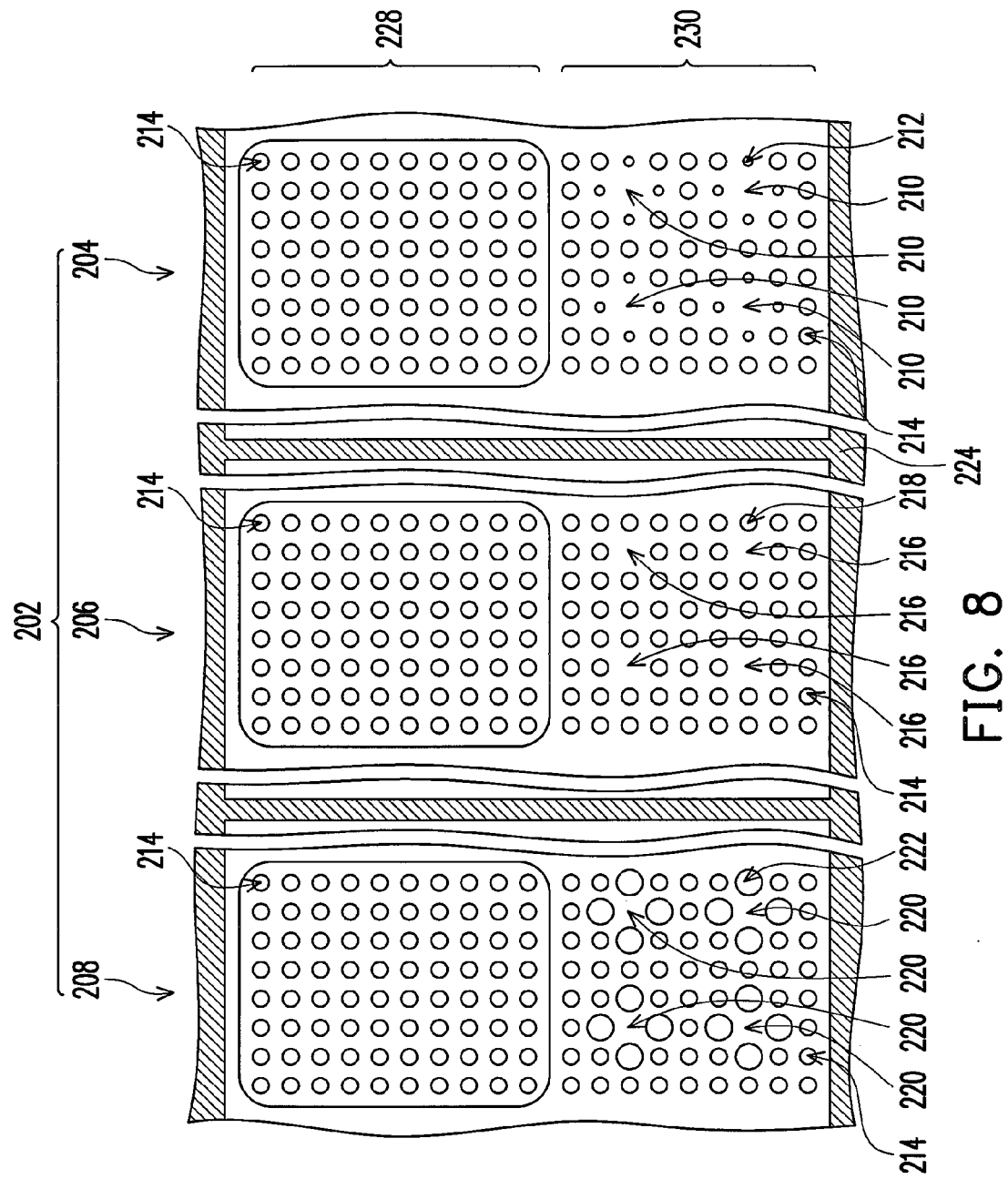
FIG. 8 is a top view of a color filter provided by the fourth embodiment of the present invention.

FIG. 8 is a top view of a color filter provided by the fourth embodiment of the present invention.

Referring to FIGS. 5 and 8, in the color filter of FIG. 5, the red photonic crystal structure 204, the green photonic crystal structure 206 and the blue photonic crystal structure 208 only have a first defect resonance cavity 210, a second defect resonance cavity 216 and a third defect resonance cavity 220, respectively, for providing the light with specific wavelength, therefore, the optical transmittance of the color filter layer 202 may not be sufficient, which affects the brightness of an LCD display.

However, in the color filter of FIG. 8, each red photonic crystal structure 204, green photonic crystal structure 206 and blue photonic crystal structure 208 respectively have multiple first defect resonance cavities 210, multiple second defect resonance cavities 216 and multiple third defect resonance cavities 220, where multiple defect resonance cavities are able to excite light with a same wavelength simultaneously, hence, the optical transmittance of the whole color filter layer can be increased. The other structure details in FIG. 8 are the same as the color filter of FIG. 5, and it is omitted to describe herein for simplicity.

Figure 9:
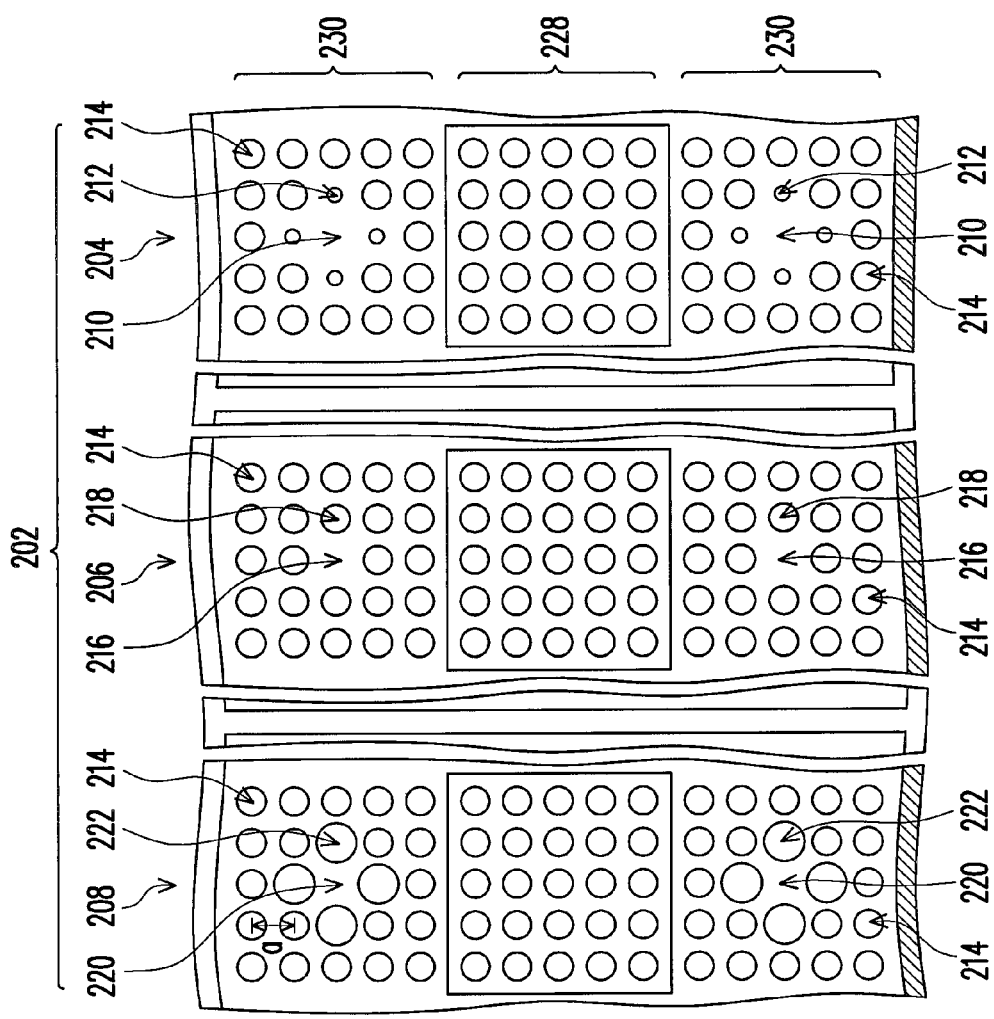
FIG. 9 is a top view of a color filter provided by the fifth embodiment of the present invention.

FIG. 9 is a top view of a color filter provided by the fifth embodiment of the present invention.

Referring to FIGS. 5, 8 and 9, in the color filter of FIGS. 5 and 8, the reflective region 228 and the transmissive region 230 are respectively disposed in the upper portion and the lower portion of every pixel region, which would cause an optical interference with some display patterns or produce an excessive light intensity with the light reflected from the upper portion of the pixel regions and accordingly deteriorate the quality of the color display mode.

However, in the color filter of FIG. 9, a reflective region 228 and transmissive regions 230 in each of the pixel regions are alternately disposed, which provides a more uniform combination of the reflective region 228 and the transmissive regions 230 to achieve a better display quality.

It should be noted, in the present invention, only a defect resonance cavity is respectively disposed over the reflective region 228 and under the transmissive region 230, but the present invention is not limited thereto. In another embodiment, more than one defect resonance cavity can be respectively disposed in each of transmissive regions 230 over and under the reflective region 228.

In summary, the present invention has at least the following advantages:

1. Since the color filter provided by the present invention has defect resonance cavities, it is able to effectively control the frequency width and advance the color saturation.

2. Since the color filter provided by the present invention allows multiple defect resonance cavities to be disposed in a same photonic crystal structure, it is able to increase the optical transmittance of the color filter layer and further enhance the brightness of an LCD.

3. The color filter provided by the present invention possesses a better light-collecting effect, which helps to increase the light utilization efficiency, reduce the usage of lens films (brightness-increasing films) to save production cost and moreover, reduce the dark state oblique light-leaking to enhance the display contrast.

4. The method for fabricating a color filter provided by the present invention only requires performing a photolithography process, which not only reduces the process complexity and the production cost, but also increases the production yield.

5. For the application of a transflective display, the color filter provided by the present invention can provide both black and white display mode and color display mode.

6. With the application of a transflective display, the color filter provided by the present invention can achieve a better display quality by adjusting the relative position between the reflective region and the transmissive region.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color filter, comprising:
   a substrate; and
   a color filter layer, disposed on the substrate and comprising:
      a red photonic crystal structure, comprising a first defect resonance cavity and having multiple first holes surrounding the first defect resonance cavity and multiple fourth holes in a periodic arrangement;
      a green photonic crystal structure, comprising a second defect resonance cavity and having multiple second holes surrounding the second defect resonance cavity and the fourth holes in a periodic arrangement; and
      a blue photonic crystal structure, comprising a third defect resonance cavity and having multiple third holes surrounding the third defect resonance cavity and the fourth holes in a periodic arrangement, wherein
      the hole diameter of the first holes is less than the hole diameter of the second holes and the hole diameter of the second holes is less than the hole diameter of the third holes.

2. The color filter according to claim 1, wherein the material of the color filter layer comprises dielectric material.

3. The color filter according to claim 1, further comprising a black matrix disposed on the substrate to define multiple pixel regions on the substrate.

4. The color filter according to claim 3, wherein the red photonic crystal structure, the green photonic crystal structure and the blue photonic crystal structure are respectively disposed in each of the corresponding pixel regions.

5. The color filter according to claim 1, wherein the substrate comprises a transparent substrate.

6. A color filter, comprising:
   a substrate; and
   a color filter layer, disposed on the substrate and comprising:
      a red photonic crystal structure, comprising multiple first defect resonance cavities and having multiple first holes surrounding the first defect resonance cavities and multiple fourth holes in a periodic arrangement, wherein the distance between two adjacent first defect resonance cavities is larger than or equal to three periodic intervals;
      a green photonic crystal structure, comprising multiple second defect resonance cavities and having multiple second holes surrounding the second defect resonance cavities and the fourth holes in a periodic arrangement, wherein the distance between two adjacent second defect resonance cavities is larger than or equal to three periodic intervals; and
      a blue photonic crystal structure, comprising multiple third defect resonance cavities and having multiple third holes surrounding the third defect resonance cavities and the fourth holes in a periodic arrangement, wherein the distance between two adjacent third defect resonance cavities is larger than or equal to three periodic intervals, wherein
      the hole diameter of the first holes is less than the hole diameter of the second holes and the hole diameter of the second holes is less than the hole diameter of the third holes.

7. The color filter according to claim 6, wherein the material of the color filter layer comprises dielectric material.

8. The color filter according to claim 6, further comprising a black matrix disposed on the substrate to define multiple pixel regions on the substrate.

9. The color filter according to claim 8, wherein the red photonic crystal structure, the green photonic crystal structure and the blue photonic crystal structure are respectively disposed in each of the corresponding pixel regions.

10. The color filter according to claim 6, wherein the substrate comprises a transparent substrate.

11. A fabricating method of a color filter, comprising:
    providing a substrate;
    forming a photonic crystal material layer on the substrate; and
    patterning the photonic crystal material layer to form a color filter layer, wherein the color filter layer comprises:

a red photonic crystal structure, comprising a first defect resonance cavity and having multiple first holes surrounding the first defect resonance cavity and multiple fourth holes in a periodic arrangement;

a green photonic crystal structure, comprising a second defect resonance cavity and having multiple second holes surrounding the second defect resonance cavity and the fourth holes in a periodic arrangement; and a blue photonic crystal structure, comprising a third defect resonance cavity disposed in the transmissive region and having multiple third holes surrounding the third defect resonance cavity and the fourth holes in a periodic arrangement, wherein the hole diameter of the first holes is less than the hole diameter of the second holes and the hole diameter of the second holes is less than the hole diameter of the third holes.

12. The fabricating method of a color filter according to claim 11, wherein the material of the color filter layer comprises dielectric material.

13. The fabricating method of a color filter according to claim 11, further comprising forming a black matrix on the substrate to define multiple pixel regions on the substrate.

14. The fabricating method of a color filter according to claim 13, wherein the red photonic crystal structure, green photonic crystal structure and blue photonic crystal structure are respectively disposed in each of the corresponding pixel regions.

15. The fabricating method of a color filter according to claim 11, wherein the substrate comprises a transparent substrate.

16. A color filter, comprising:
a substrate, comprising a reflective region and a transmissive region;
an organic material layer, disposed on the substrate and in the reflective region; and
a color filter layer, disposed on the substrate and covering the organic material layer; the color filter layer comprising:
  a red photonic crystal structure, comprising a first defect resonance cavity disposed in the transmissive region and having multiple first holes surrounding the first defect resonance cavity and multiple fourth holes in a periodic arrangement;
  a green photonic crystal structure, comprising a second defect resonance cavity disposed in the transmissive region and having multiple second holes surrounding the second defect resonance cavity and the fourth holes in a periodic arrangement; and
  a blue photonic crystal structure, comprising a third defect resonance cavity disposed in the transmissive region and having multiple third holes surrounding the third defect resonance cavity and the fourth holes in a periodic arrangement, wherein
  the hole diameter of the first holes is less than the hole diameter of the second holes and the hole diameter of the second holes is less than the hole diameter of the third holes.

17. The color filter according to claim 16, wherein the material of the color filter layer comprises dielectric material.

18. The color filter according to claim 16, further comprising a black matrix disposed on the substrate to define multiple pixel regions on the substrate.

19. The color filter according to claim 18, wherein the red photonic crystal structure, the green photonic crystal structure and the blue photonic crystal structure are respectively disposed in each of the corresponding pixel regions.

20. The color filter according to claim 18, wherein the reflective region and the transmissive region are adjacently disposed in each of the pixel regions.

21. The color filter according to claim 18, wherein the reflective region and the transmissive region are alternately disposed in each of the pixel regions.

22. The color filter according to claim 16, wherein the material of the organic material layer is silicon nitride or silicon oxide.

23. The color filter according to claim 16, wherein the substrate comprises a transparent substrate.

24. A color filter, comprising:
a substrate, comprising a reflective region and a transmissive region;
an organic material layer, disposed on the substrate and in the reflective region; and
a color filter layer, disposed on the substrate and covering the organic material layer; the color filter layer comprising:
  a red photonic crystal structure, comprising multiple first defect resonance cavities disposed in the transmissive region and having multiple first holes surrounding the first defect resonance cavities and multiple fourth holes in a periodic arrangement, wherein the distance between two adjacent first defect resonance cavities is larger than or equal to three periodic intervals;
  a green photonic crystal structure, comprising multiple second defect resonance cavities disposed in the transmissive region and having multiple second holes surrounding the second defect resonance cavities and the fourth holes in a periodic arrangement, wherein the distance between two adjacent second defect resonance cavities is larger than or equal to three periodic intervals; and
  a blue photonic crystal structure, comprising multiple third defect resonance cavities disposed in the transmissive region and having multiple third holes surrounding the third defect resonance cavities and the fourth holes in a periodic arrangement, wherein the distance between two adjacent third defect resonance cavities is larger than or equal to three periodic intervals, wherein
  the hole diameter of the first holes is less than the hole diameter of the second holes and the hole diameter of the second holes is less than the hole diameter of the third holes.

25. The color filter according to claim 24, wherein the material of the color filter layer comprises dielectric material.

26. The color filter according to claim 24, further comprising a black matrix disposed on the substrate to define multiple pixel regions on the substrate.

27. The color filter according to claim 26, wherein the red photonic crystal structure, the green photonic crystal structure and the blue photonic crystal structure are respectively disposed in each of the corresponding pixel regions.

28. The color filter according to claim 26, wherein the reflective region and the transmissive region are adjacently disposed in each of the pixel regions.

29. The color filter according to claim 26, wherein the reflective region and the transmissive region are alternately disposed in each of the pixel regions.

30. The color filter according to claim 24, wherein the material of the organic material layer is silicon nitride or silicon oxide.

31. The color filter according to claim 24, wherein the substrate comprises a transparent substrate.

32. A fabricating method of a color filter, comprising:

providing a substrate comprising a reflective region and a transmissive region;

forming an organic material layer on the substrate and in the reflective region;

forming a photonic crystal material layer on the substrate, wherein the photonic crystal material layer covers the organic material layer; and patterning the photonic crystal material layer to form a color filter layer, wherein the color filter layer comprises:

- a red photonic crystal structure, comprising a first defect resonance cavity disposed in the transmissive region and having multiple first holes surrounding the first defect resonance cavity and multiple fourth holes in a periodic arrangement;
- a green photonic crystal structure, comprising a second defect resonance cavity disposed in the transmissive region and having multiple second holes surrounding the second defect resonance cavity and the fourth holes in a periodic arrangement; and
- a blue photonic crystal structure, comprising a third defect resonance cavity disposed in the transmissive region and having multiple third holes surrounding the third defect resonance cavity and the fourth holes in a periodic arrangement, wherein the hole diameter of the first holes is less than the hole diameter of the second holes and the hole diameter of the second holes is less than the hole diameter of the third holes.

33. The fabricating method of a color filter according to claim 32, wherein the material of the photonic crystal material layer comprises dielectric material.

34. The fabricating method of a color filter according to claim 32, further comprising forming a black matrix on the substrate to define multiple pixel regions on the substrate.

35. The fabricating method of a color filter according to claim 34, wherein the red photonic crystal structure, the green photonic crystal structure and the blue photonic crystal structure are respectively disposed in each of the corresponding pixel regions.

36. The fabricating method of a color filter according to claim 34, wherein the reflective region and the transmissive region are adjacently disposed in each of the pixel regions.

37. The fabricating method of a color filter according to claim 34, wherein the reflective region and the transmissive region are alternately disposed in each of the pixel regions.

38. The fabricating method of a color filter according to claim 32, wherein the material of the organic material layer is silicon nitride or silicon oxide.

39. The fabricating method of a color filter according to claim 32, wherein the substrate comprises a transparent substrate.

* * * * *